(12) United States Patent
Schwartz et al.

(10) Patent No.: US 9,952,082 B2
(45) Date of Patent: Apr. 24, 2018

(54) PRINTED LEVEL SENSOR

(71) Applicant: Palo Alto Research Center Incorporated, Palo Alto, CA (US)

(72) Inventors: David E. Schwartz, San Carlos, CA (US); Yunda Wang, Milpitas, CA (US); Robert A. Street, Palo Alto, CA (US); Ping Mei, San Jose, CA (US); Janos Veres, San Jose, CA (US); Gregory L. Whiting, Menlo Park, CA (US); Steven E. Ready, Los Altos, CA (US); Tse Nga Ng, San Diego, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 0 days.

(21) Appl. No.: 15/150,939

(22) Filed: May 10, 2016

(65) Prior Publication Data
US 2017/0328761 A1 Nov. 16, 2017

(51) Int. Cl.
G01F 23/26 (2006.01)

(52) U.S. Cl.
CPC ............ G01F 23/26 (2013.01); G01F 23/266 (2013.01)

(58) Field of Classification Search
CPC ....................................... G01F 23/26
See application file for complete search history.

(56) References Cited

U.S. PATENT DOCUMENTS

| | | | |
|---|---|---|---|
| 2006/0011124 A1 | 1/2006 | Odashiro | |
| 2008/0236275 A1* | 10/2008 | Breed | B60C 11/24 73/290 V |
| 2011/0259960 A1* | 10/2011 | Baarman | G01F 23/20 235/385 |
| 2012/0227484 A1* | 9/2012 | Chen | A61M 1/28 73/304 R |
| 2015/0031789 A1 | 1/2015 | Botti et al. | |

* cited by examiner

*Primary Examiner* — Minh Phan
*Assistant Examiner* — Zannatul Ferdous
(74) *Attorney, Agent, or Firm* — Fay Sharpe LLP

(57) ABSTRACT

The level sensor system includes a level sensor label configured to be associated with a container containing a material whose level is to be sensed, the level sensor label arrangement having a circuit which includes an inductive element electrically connected to a capacitive structure configured to be associated with the container.

18 Claims, 14 Drawing Sheets

PRINTED LEVEL SENSOR

BACKGROUND

The present application is directed to the art of measurement and more particularly to measuring material levels in containers, bags and other holding mediums.

BRIEF DESCRIPTION

A level sensor system which includes a level sensor label configured to be associated with a container containing a material whose level is to be sensed, the level sensor label arrangement having a circuit which includes an inductive element electrically connected to a capacitive structure configured to be associated with the container.

The level sensing system including the level sensing label, further including a second inductive element arrangement in electrical connection with the inductive element arrangement and the capacitive structure. The level sensing system having the container includes one of a fluid and a solid material. The level sensing system wherein the capacitive structure is a digital capacitive structure. The level sensing system wherein the level sensor label is a printed level sensor label. The level sensing system wherein the level sensor label further includes an antenna for RF backscatters measurement. The level sensing system further including a reader configured to receive signals from the level sensor label. The level sensing system wherein the reader includes remote communication capability. The level sensing system wherein the reader is one of a reader built into a holder, a reader built into a shelf, and a reader which is a handheld reader. The level sensing system wherein the reader further includes a built in data storage for batch communication of data.

A method is provided for forming a level sensing system. The method includes forming a level sensor label by printing a first capacitive element, and printing a second capacitive element a predetermined distance from the first capacitive element, wherein the first capacitive element and the second capacitive element form a capacitive structure. An inductive element is also printed, along with electrical connections between the capacitive structure and the inductive element. The printing of the foregoing may be accomplished in any of a number of different orders. The method further including forming a reader configured to read signals from the level sensor label. The method further including placing the capacitive structure in association with a container, wherein electric field lines formed by the capacitive structure pass through at least a portion of an interior of the container. The method using at least one of ink-jet type printing, extrusion type printing, screen type printing, gravure type printing, aerosol type printing and 3D type printing. The method further including printing the capacitive structure and the inductive element with a conductive ink type material. The method further including sensing signals from the level sensor label by a reader. The method further including printing an antenna as part of the level sensor label.

DETAILED DESCRIPTION

The present application is directed to a level sensing system which includes a disposable passive electronic level sensor label fabricated by use of printing operations to create printed level sensor labels at low cost.

Figure 1:
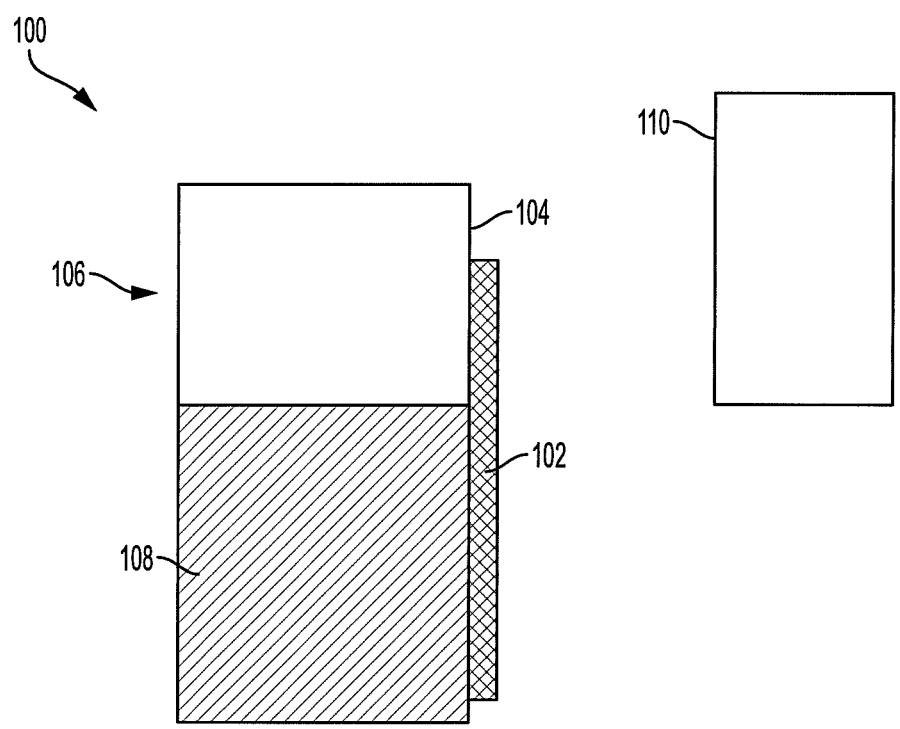
FIG. 1 illustrates a level sensing system according to the present application.

FIG. 1 provides a side view of a simplified drawing of a level sensing system 100 including disposable electronic printed level sensor (a "smart label") 102, which is adhered to a surface 104 of a container 106. The container is shown with a material 108 such as a liquid or solid (e.g., powder or granulated) filled up to a certain level. Another aspect of the level sensing system 100 is an electronic reader 110 such as in the form of a capacitive sensor reader. The reader 110 is configured to be placed an appropriate distance from the level sensor label 102, such that signals from the level sensor label are detected by reader 110.

As will be explained in more detail, in one embodiment the level sensor label 102 is configured with a capacitive structure and inductive coil in the form of a resonant tank circuit on a substrate. When the level sensor label 102 is adhered to a container such as container 106 including material 108. The level of the material 108 inside the container 106 affects the impedance of the mentioned resonant tank circuit in such a way as to be measurable remotely via inductive (e.g., near-field) coupling achieved by use of reader 110. It is to be appreciated container 106 may be in the form of a bottle which is of stiff construction, as well as containers which are flexible, such as plastic bags (e.g., IV drip bags found in hospitals).

Figure 2:
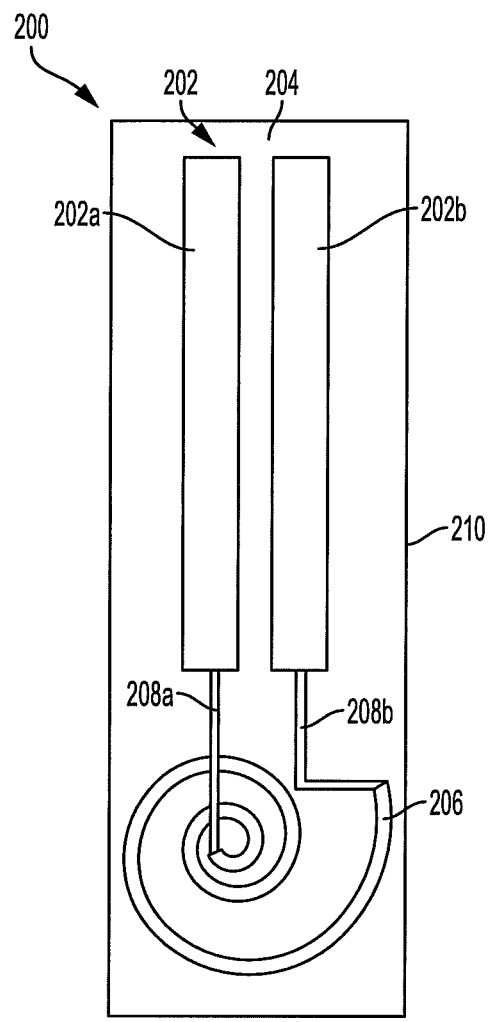
FIG. 2 depicts an implementation of a level sensor label.

Turning to FIG. 2, depicted is a level sensor label 200 depicted in additional detail. In this embodiment, level sensor label 200 contains a capacitor 202 comprised of two conductive strips, conductive strip 202*a* and conductive strip 202*b*, located a predetermined distance 204 from each other. The conductive strips are electrically connected to an inductive element or arrangement 206 such as in the form of inductive coil(s). The capacitor 202 and inductive arrangement 206 are connected via leads 208*a* and 208*b*. The conductive arrangement 206 provides both inductive reactance to the LC resonant tank circuit formed by capacitor 202 and inductive arrangement 206, and a way for reading output signals from the level sensor label 200. In this embodiment the level sensor label 200 is positioned on a substrate 210 which may be a flexible or non-flexible substrate.

Figure 3:
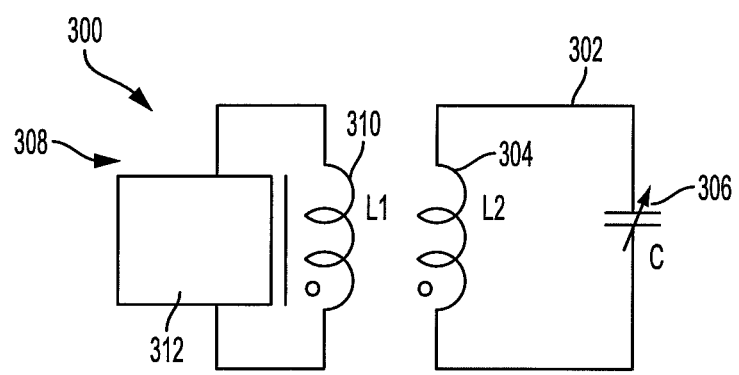
FIG. 3 depicts an equivalent circuit of a level sensing system in the form of a near-field coupled capacitive sensor according to the present application.

To illustrate the readout concept, attention is directed to FIG. 3 which provides a simplified equivalent circuit 300 of a near-field coupled level sensor label 302 (e.g., of a level sensor label such as 200 of FIG. 2). More particularly, the equivalent circuit 302 illustrates the LC resonant tank circuit having inductive coil portion 304 and capacitive element 306 electrically connected to each other. Further shown in FIG. 3 is a simplified reader circuit 308 having an inductive coil portion 310 and electronics 312 used to process signals read out by inductive coil portion 310 from inductive coil portion 304. Electronics 312 and coil portion 310 are further configured to apply a voltage or current to the inductive coil 304 of the level sensor label 301, and is then able to measure the corresponding current or voltage.

Figure 4:
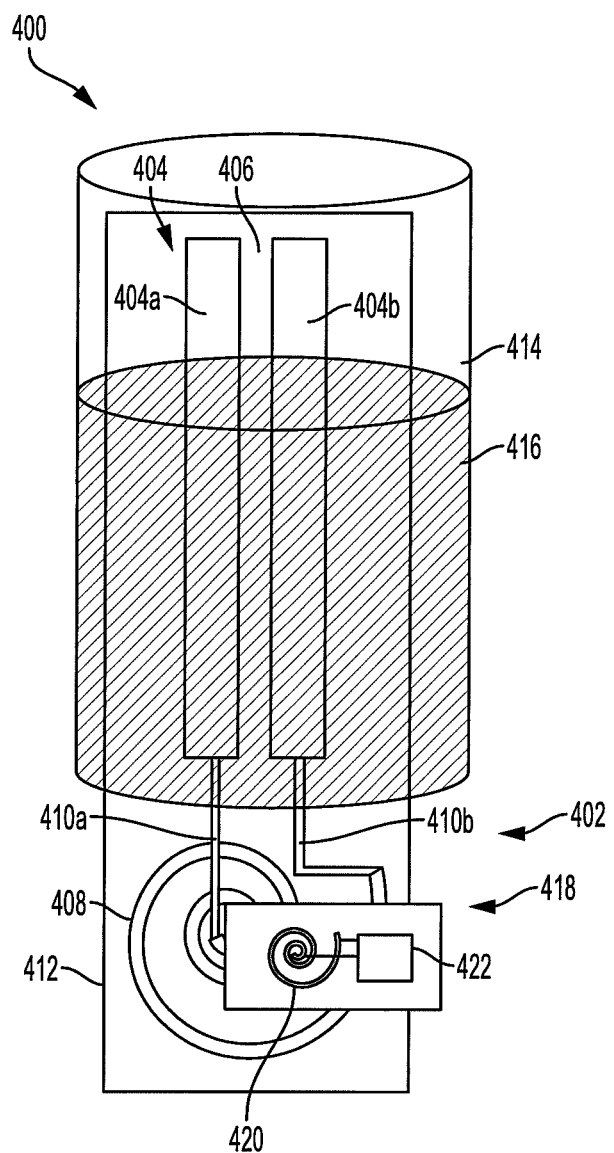
FIG. 4 depicts an implementation of a level sensing system in use.

Turning to FIG. 4, illustrated is an alternative view of a level sensing system 400 which employs level sensor label (smart label) 402 consisting of capacitive structure 404 having conductive strip 404a and conductive strip 404b a predetermined distance apart 406, and an inductive coil portion 408, connected via leads 410a, 410b. The circuitry of the level sensor label 402 is carried on a substrate 412 that may be flexible or rigid. The level sensor label 402 is at least partially associated or in physical contact with container 414 which has a material (e.g., a fluid or solid) 416 at least partially filling the interior of the container 414. Substrate 412 in this embodiment being adhered to the container 414 by use of an adhesive or other appropriate manner. Also depicted is a reader 418 having an inductive coil portion 420 and an electronics portion 422. Ideally in this use the container 414 is in an upright position. Again, container 414, while shown as a solid stiff structure, may also be in the form of a flexible bag, including plastic bags as well as in other forms. In different embodiments container 414 is transparent, partially transparent or opaque. The conductive strips 404a, 404b of capacitive structure 404 are generally oriented along the height of the container 414. Many designs of the capacitive strips 404a, 404b are contemplated, including a single pair, multiple pairs, interdigitated pairs, integrated structures and others.

The width of strips 404a, 4-4b and spacing 406 is determined such that when a potential is applied between strips 404a, 404b, the electric field lines pass through at least a portion of the interior of container 414. The material level is sensed as a change in capacitance between strips 404a, 404b. The capacitance is a function of the permittivity of the substance of the container and material within the container through which the electric field lines pass. With a greater amount of material in the container, more field lines pass through the material relative to air. With a lower material level, fewer electric field lines pass therethrough. As the permittivity of the material is generally higher than that of air (for example, the relative permittivity of water is about 80.4), the capacitance will be higher with a higher material level.

Capacitive structure 404 is designed to maximize the change in capacitance with the changing material level in the container. Some geometrical considerations which affect this include: the spacing between the strips, the width of the strips, the thickness of the container walls, and the container wall substance. For example, the container 414 is in embodiments a dielectric material (e.g., glass, plastic, etc.). A rule of thumb is that the average spacing between the strips (i.e., electrodes) should be greater than the thickness of the container wall. This, however, will also depend on the material type and other factors of a particular implementation.

Capacitive structure 404 is connected to inductive coil 408. A combination of these two elements form a resonant tank circuit. Ideally, such a tank circuit has a resonant frequency of f=1/(2 pi sqrt(LC)), where L is the inductance of the coil and C is capacitance of the capacitor. In practice, parasitic capacitance of the inductive coil 408 will affect the resonant frequency. Also, resistance of the coil and the capacitor act to reduce quality factor (Q) of the resonant tank. In constructing level sensor label 402, it is desirable to have a sufficiently low resistance and a high Q. The ranges will depend upon the particular implementations.

The design of capacitor structure 404 (as well as the other capacitor structures of this disclosure) take into consideration the desired resonant frequency of the system (e.g., 400). For example, a typical inductance of a printed coil is 10 μH. For resonant frequency of around 10 MHz, the average capacitance would be around 25 pF.

Figure 5:
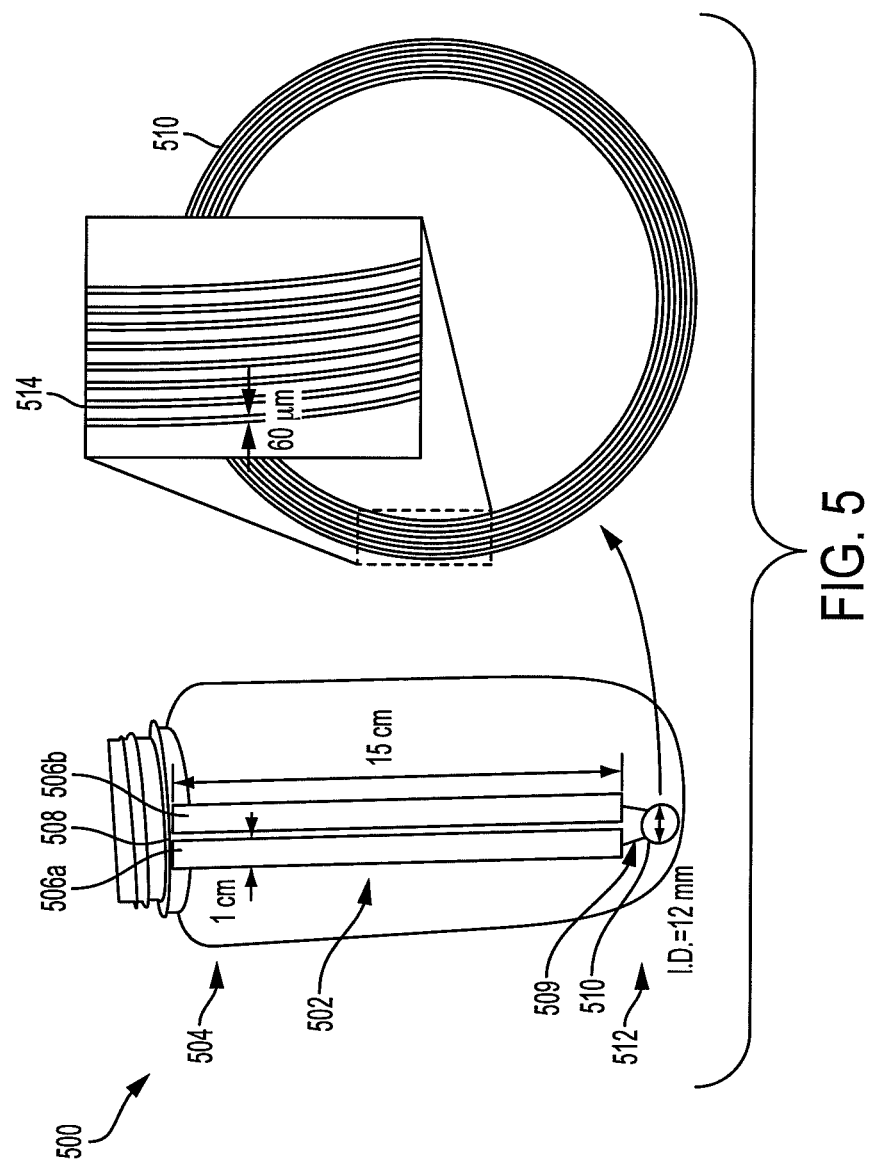
FIG. 5 illustrates a prototype of a level sensor label.

Turning to FIG. 5, illustrated is a particular experimental implementation 500 of a level sensor label (smart label) 502 associated with container 504.

Capacitive strips 506a, 506b are 1 cm wide and have 1 mm spacing 508. Connection lines 509 connect to inductive coil 510 designed to have an inner diameter 512 of 12 mm with a line width 514 of ~60 micrometers. In such a design, the coil has an approximate inductance of 1.5 μH. When the level sensor label 502 is attached to a plastic container (such as 504) with ~1-mm-thick walls, the capacitance changes in a range of ~13 pF to 6 pF as the level of deionized water changes from about 13 cm to about 3 cm.

As the capacitance changes, the resonant frequency, and the magnitude of the tank impedance at a given frequency change. To read this change in a signal, a reader device having a reader coil (e.g., 110 of FIG. 1; 308 of FIG. 3; 418 of FIG. 4) on a second substrate (for example a PCB) is placed in close proximity (e.g., FIG. 4) to the inductive coil such that the two are inductively coupled. The coupling factor, k, is at least dependent on the geometry of the two coils, their proximity, and their relative position. The coupling factor also affects the resonant frequency and is a source of measurement uncertainty.

Table 1 below provides particular dimensions for the arrangement of FIG. 5 including a reader, such as shown in FIGS. 1, 3 and 4:

TABLE 1

Design parameters of prototype

| Symbol | Description | Value |
|---|---|---|
| W | Width of the strips | 1 cm |
| S | Length of the strips | 15 cm |
| d | Distance between the strips | 1 mm |
| C | Capacitance range of the strip capacitor | ~6 pF to 13 pF |
| ID-1 | Inner diameter of the inductive coil | 12 mm |
| ID-2 | Inner diameter of the reader coil | 15 mm |
| n1 | Number of turns of the inductive coil | 8 |
| n2 | Number of turns of the reader coil | 8 |
| L1 | Inductance of the inductive coil | 1.5 μH |
| L2 | Inductance of the reader coil | 2 μH |
| T | Wall thickness of the container | ~1 mm |

As mentioned, a reader coil of the previously described readers is connected to an electronic circuit or integrated circuit capable of applying a voltage or current to the inductive coil of the level sensor label and then measuring the corresponding current or voltage, respectively. The instrument is configured to be capable of measuring the frequency response of the level sensor label. A number of designs and methods of making such readings are well known in the art and will not be described in greater detail here. However, examples include the input signal being a series of high frequency sinusoidal signals, a chirp, or a signal with multiple high frequency components. The reader instrument may in embodiments be a spectrum analyzer or an impedance analyzer, among others.

Because the capacitance changes as a function of the level of the material, the reader measures a change in the resonant frequency in accordance with the changing level of the material internal to the container. The correlation between the level and the resonant frequency depends on at least the type of material, the geometry, the container properties, and other factors specific to a particular implementation.

Figure 6:
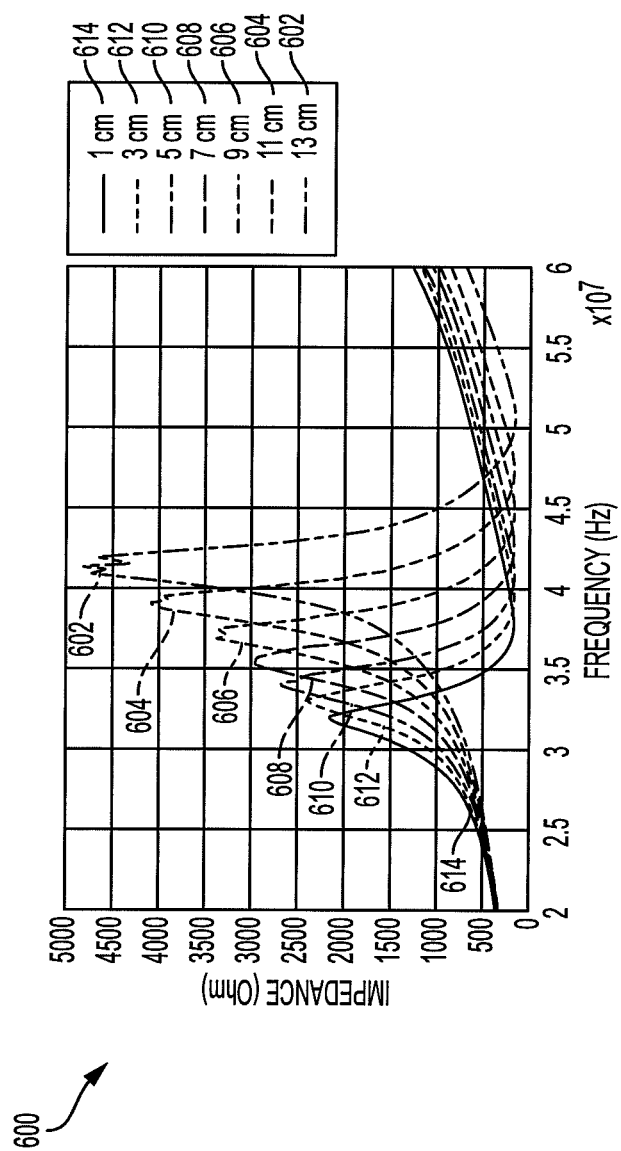
FIG. 6 is a graph showing a measured impedance spectrum of level sensor label of FIG. 5.

Turning to FIG. 6, illustrated is a measured impedance spectrum for a system constructed according to the concepts of FIG. 5. As illustrated, a resonant frequency measured by the reader will shift from about 41 MHz to about 32 MHz as the liquid level changes from 1 cm to 13 cm. More particularly, the graph 600 of FIG. 6 includes a legend identifying impedance signals generated when the fluid (deionized water) in the container is at different levels from 13 cm to 1 cm (i.e., 13 cm 602; 11 cm 604; 9 cm 606; 7 cm 608; 5 cm 610; 3 cm 612; and 1 cm 614). More particularly, peak impedance occurs at about 41 MHz (corresponding to 13 cm of fluid) and is lowest at about 32 MHz (corresponding to 1 cm of fluid).

Figure 7:
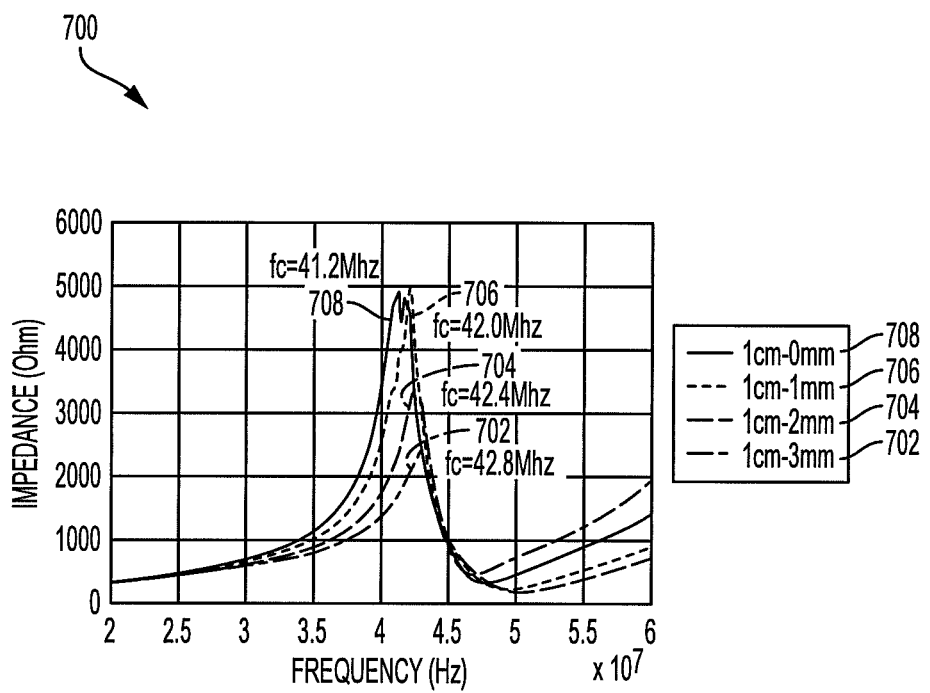
FIG. 7 is a chart for measured sensitivity of a single-coil level sensor label of FIG. 5 to proximity of reader coil.

Turning to FIG. 7, illustrated is a graph 700 that plots impedance vs. frequency dependent upon the location of the reader to the level sensor label, for a system such as shown in FIG. 5. For example, from 1 cm to 3 mm (702), the resonant frequency is approximately 42.8 MHz; when the reader is from 1 cm to 2 mm (704) the resonant frequency is 42.4 MHz; when the reader is from 1 cm to 1 mm (706) the resonant frequency is 42.0 MHz; and when the reader is from 1 cm to 0 mm from the level sensor label (708) the resonant frequency is 41.2 MHz. Therefore, it can be seen the design of FIG. 5 is sensitive to the placement of the reader coil in relationship to the label sensor.

Figure 8:
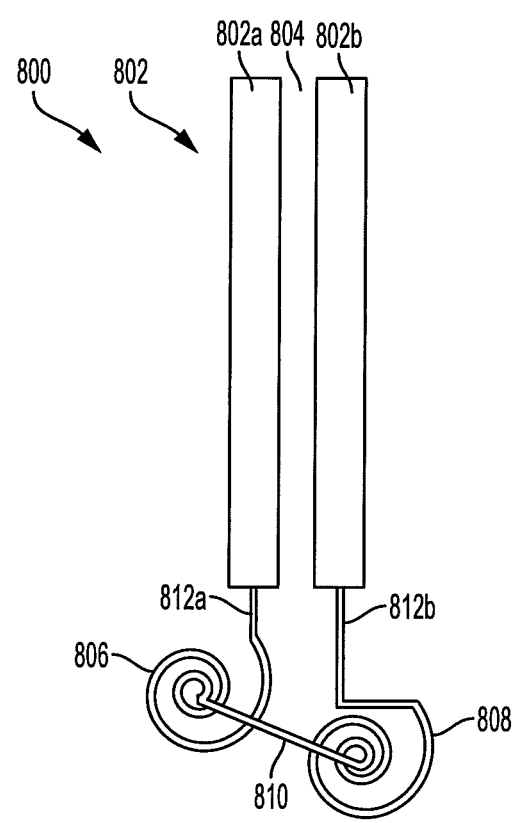
FIG. 8 illustrates an alternative level sensor label designed with a separate load coil.

Turning to one manner of decreasing this sensitivity, attention is directed to FIG. 8, where the level sensor label (smart label) 800, includes capacitor 802 with capacitance strips 802a, 802b, a particular distance 804 from each other, and a load coil 806 such as used in the previous embodiments. There is further included an output or label reading coil 808, which is placed in series through connector 810 with load coil 806 and via connector lines 812a, 812b. In this design, the label reading coil 808 is sensitive to proximity to the previously described coil readers. However, the load coil 806 is less sensitive than the label reading coil 808. Therefore the impedance component of the label is less sensitive overall. This is desirable as it reduces measurement uncertainty. In simulations that were undertaken, this improvement was found to reduce the uncertainty (e.g., shown in FIG. 7) by seven times or greater than the previous embodiments.

A reader of the present application, in certain embodiments may be a small card or other device that can then further transmit either raw data or the calculated material level data for display and/or further processing or analysis. The reader may also be embedded in a holder or shelf into which the container is stored or placed. This has the further advantage of controlling the relative position between the coil of the reader and the coil in the level sensing label to reduce distance variance uncertainty.

It is also noted, as previously discussed in connection with FIG. 4, the coil of the level sensor label is not necessarily in contact with the container. By not having the coil in actual contact with the container, parasitic capacitance that might occur when the coil of the label is in physical contact with the container is minimized.

Figure 9:
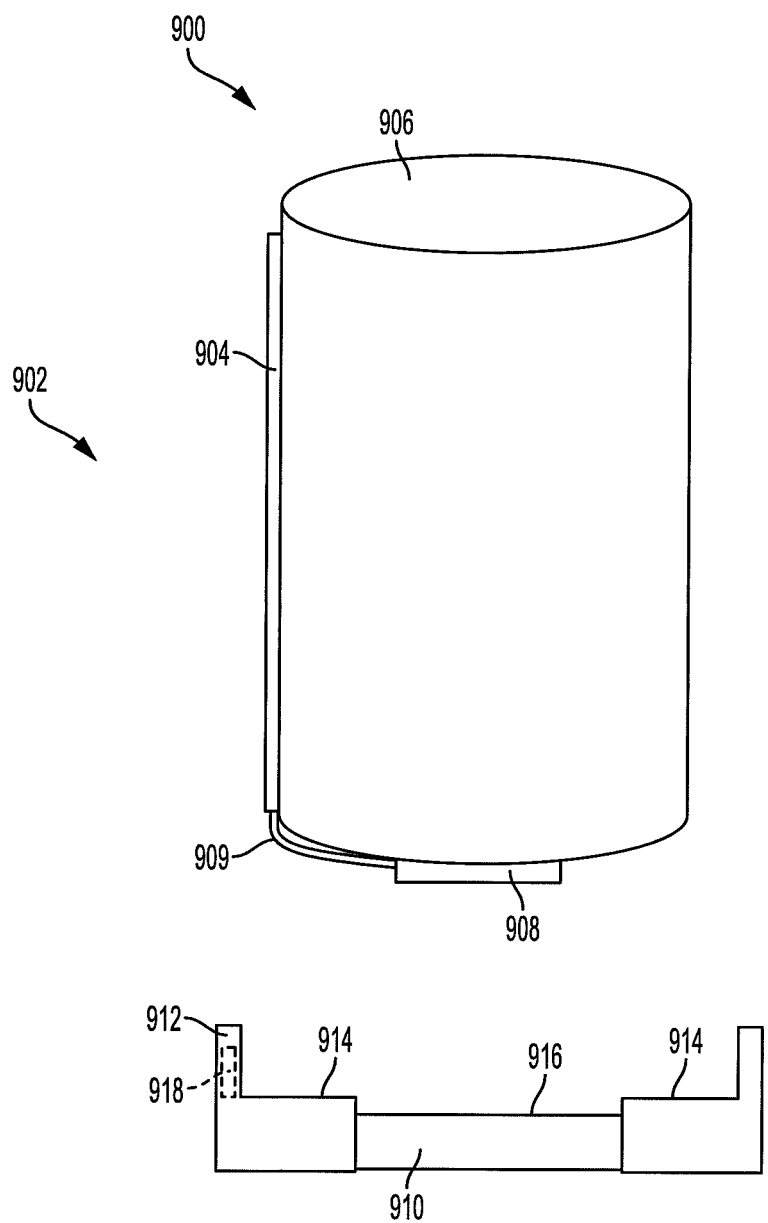
FIG. 9 shows a side view of an arrangement wherein the inductive coil is on a bottom surface of a container, and the reader is built into a holder or shelf.
Figure 10:
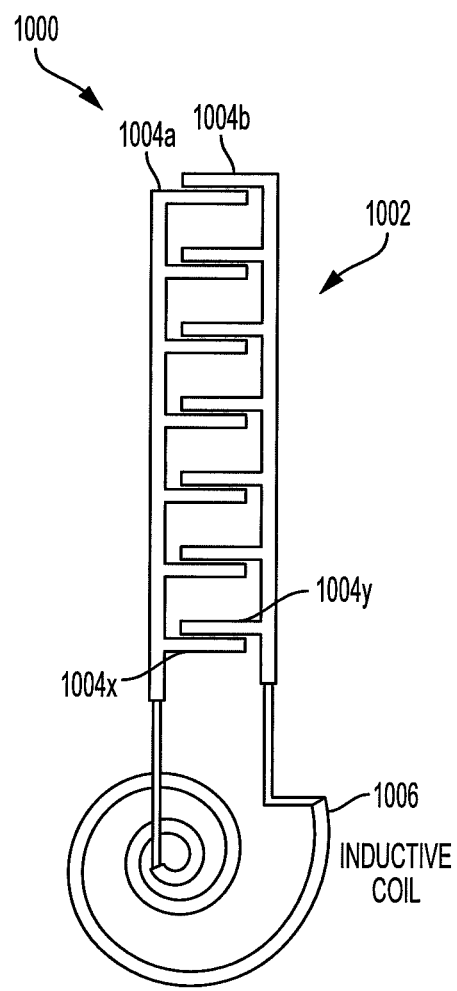
FIG. 10 illustrates another embodiment of a level sensor label which provides a digital or step output.

In alternative embodiments, the conductive coil of the level sensor label may be located on a bottom surface under a container, such as shown in FIG. 9. More particularly, arrangement 900 of FIG. 9 shows a side view where a level sensor label 902 includes capacitive structure 904 located on a side wall of container 906. In this embodiment, inductive coil arrangement 908 (which may include two or more inductor coils as discussed in connection with FIG. 8) is located on a bottom surface of container 906 and is connected via connection lines 909. As further shown, reader 910 is located within a holder or shelf 912. The container 906 may then be placed in the holder or shelf 912. As can be seen, the upper surface 914 of holder or shelf 912 is slightly above the upper surface 916 of reader 910. This design allows the coil 908 to be located a precise distance from the reader, thereby further improving the accuracy of the system. In alternative embodiments, such as where the inductive coil 908 and the capacitive structure 904 of level sensor label 902 are located all on the sidewall, the reader may be formed in a side area 918 of holder or shelf 912 also positioned to maintain a precise distance between the reader 918 and label 902.

Turning to an alternative embodiment of a level sensor label 1000, provided is a capacitive structure 1002, where the capacitive structure is an inter-digitated structure including pairs of horizontally oriented strips 1004a, 1004b through 1004x and 1004y. The capacitor structure 1002 is connected to an inductive coil 1006, such as in the previous embodiments. Also, while a single inductive coil is shown, multiple inductive coils may also be employed to increase the accuracy of the level sensor label 1000. The capacitance changes in label 1000 occur in a stepwise or digital fashion as the material (i.e., liquid or solid) changes in a container in which it is held. As the material level passes a pair of horizontally oriented strips (1004a-1004b ... 1004x-1004y), the capacitance changes and therefore the signals change in a step or digital fashion. This reduces sensitivity to the coupling factor by effectively digitizing the capacitance signal. It also reduces the need for calibration by outputting step unit changes in the material levels. Therefore, this is a digitized sensing system, as opposed to an analog sensing system that has been discussed in the previous embodiments.

Other configurations are also possible, including using multiple strips of electrodes to form the capacitor of the structures.

Figure 11:
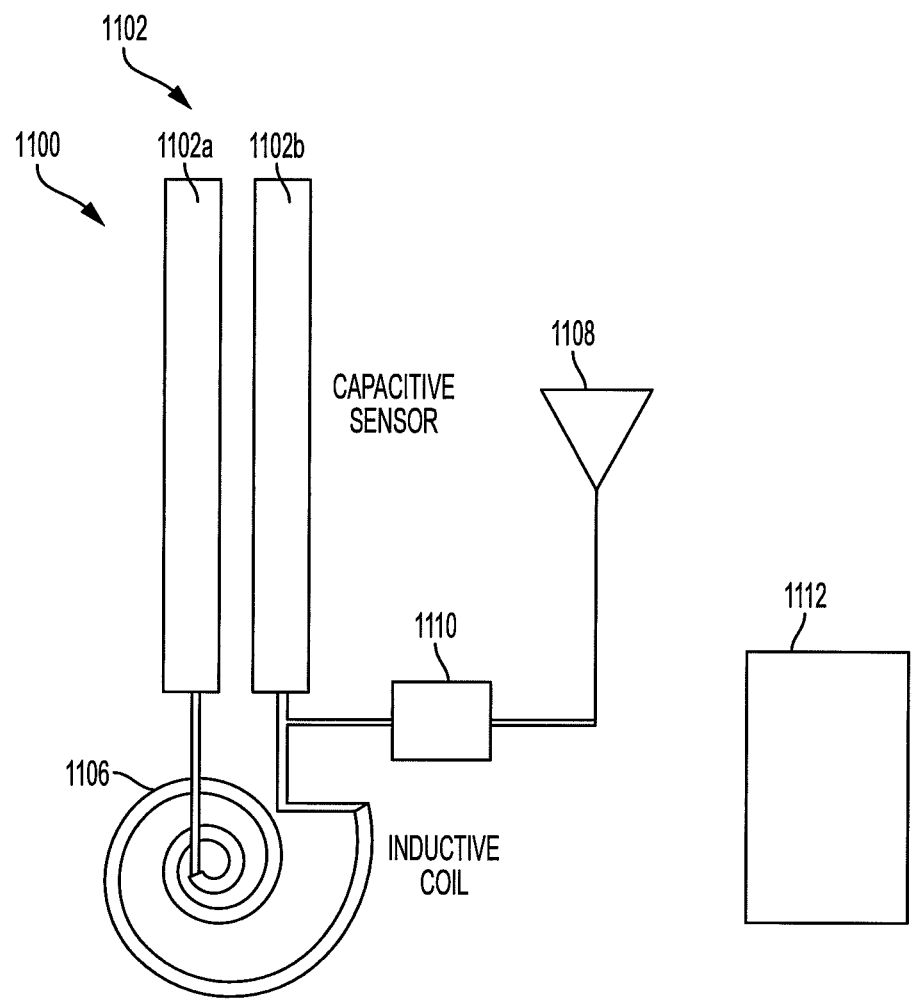
FIG. 11 illustrates a level sensing system with a level sensor label including an antenna and a far-field reader.

In another design, as shown in FIG. 11, the level sensor label 1100 is shown to include the capacitive structure 1102 having capacitive strips 1102a, 1102b connected to an inductor coil 1106. As noted in the previous embodiments, the structure of the capacitive elements 1102a, 1102b may be multiple different structures, and not just the strips shown in the figure. Similarly, while a single inductor 1106 is shown here, it is to be understood this is an inductor arrangement which may include a plurality of inductors as previously discussed. In addition to the previous elements of the level sensor label 1100 discussed above, an antenna structure 1108 is now provided, with optional electronics 1110 located between the antenna 1108 and the label 1100. In various embodiments, the optional electronics include hardware for impedance matching, amplification and/or other coupling circuitry as beneficial for a particular implementation.

Inclusion of an antenna improves the use of the level sensor label 1100 in conjunction with a far field reader 1112, which can be used to send an RF signal to the antenna 1108 and receive the backscatter output signals or measurements from a farther distance than the previous embodiments have disclosed. The reflecting signal amplitude will depend in part on the impedance of the load. From this arrangement, the material (liquid or solid) level can be determined. Alternatively, the capacitor and antenna can be one and the same.

Figure 12:
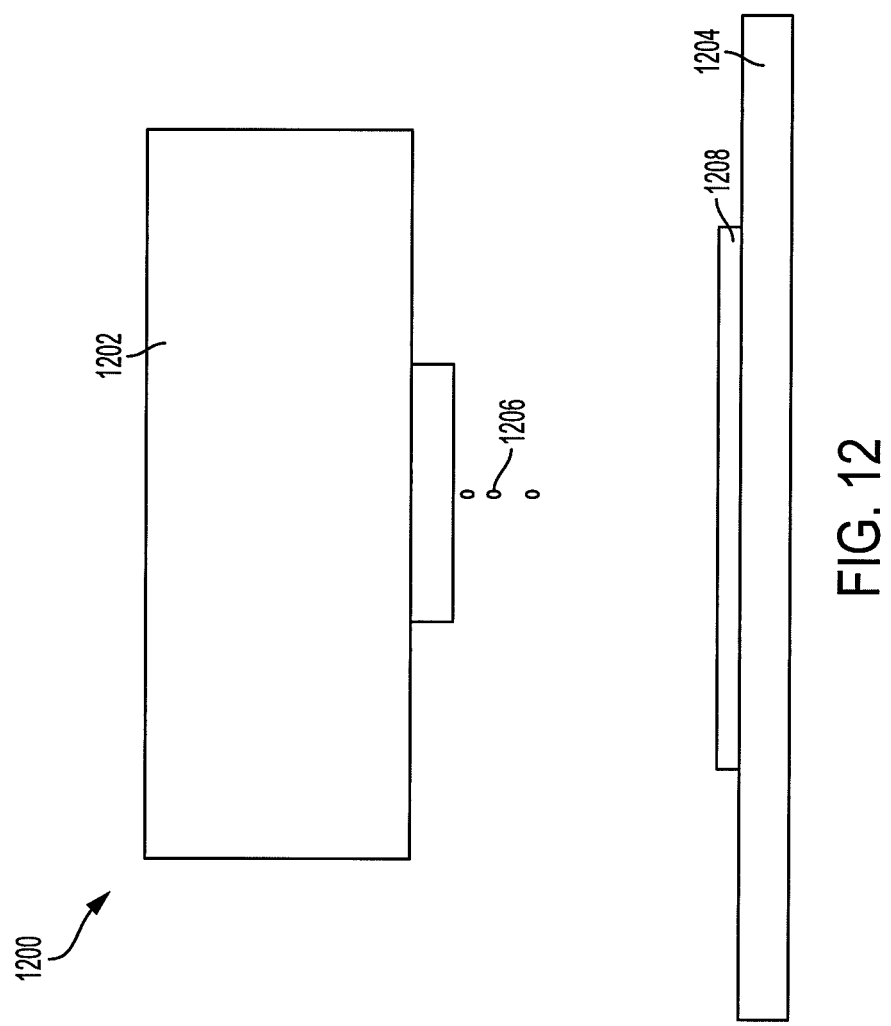
FIG. 12 depicts a printer arrangement for generating the level sensor label embodiments of the present application.

Turning to FIG. 12, illustrated is a printing system 1200 for the production of the discussed level sensor labels. In particular, a printing arrangement including a printing device 1202 and a platform 1204 is provided to print a material 1206 into the form of a level sensor label 1208 such as discussed above. In particular embodiments, all components are fabricated by the printing of conductive ink as the material 1206. Inkjet, extrusion, screen, gravure and other printing methods compatible with conductive inks may be used. Thus, the printer arrangement 1200 is understood to include the components, software and/or devices which would provide such different printing embodiments. Also represented by printing arrangement 1202 and 1204 are 3D printers, as will be discussed below. Among specific conductive inks are those made from silver or copper nanoparticles, as well as carbon. However, it is understood that this listing is not limiting, and any other conductive inks that are known to be used for the production of capacitive structures and inductive coils may be employed.

Figure 13:
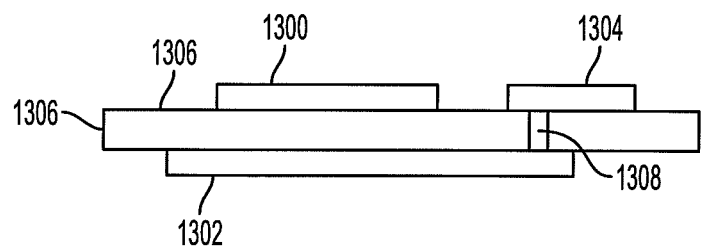
FIG. 13 illustrates printing on two sides of the substrate.

In embodiments such as shown in FIG. 13 where conductive traces cross, conductors 1300, 1302, 1304 can be printed on opposite sides of a substrate 1306 and connected by via(s) 1308 through the substrate.

A dielectric layer (polymer, epoxy, among others) may be patterned or printed on part of one conductive trace, allowing the other to be printed on top thereof. Other methods are also known and would be employable in this environment. Substrates may be made of any appropriate material, including plastic (PEN, PET, polyimide, among others), paper or other appropriate materials.

In addition to the previous printing methods, aerosol-jet printing, in which ink is carried in a focused stream of air, is another method for fabricating the capacitor structure and inductive coils within a restricted area as it allows narrow lines with high conductivity in tight spacing.

Figure 14:
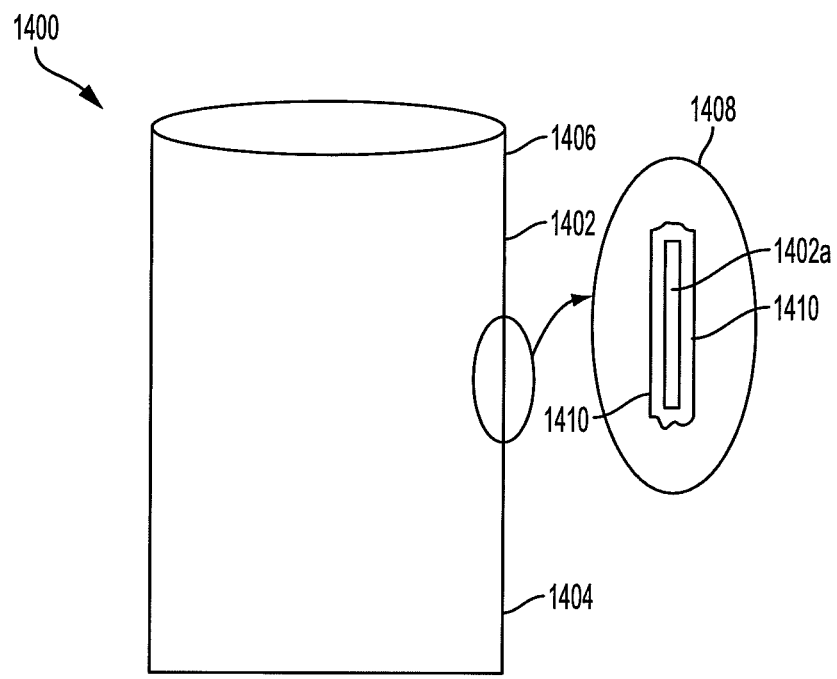
FIG. 14 illustrates another embodiment of a container where the level sensor label is configured by 3D printing within the sidewall of the container.

Turning to FIG. 14, illustrated is a structure which may be designed in accordance with the use of 3D printing. In particular, shown is a container 1400, wherein there are a level sensor 1402 having the capacitive structure and inductive coils previously discussed. In this design, as the 3D printer constructs the container 1400, a portion of the buildup from the bottom 1404 toward the top 1406, the level sensor label 1402 is constructed such that the container has the level sensor label 1402 integrated within one of the sidewalls. This is shown more clearly in the expanded partial section 1408, wherein the sidewall 1410 contains the label sensor label portion 1402a.

Figure 15:
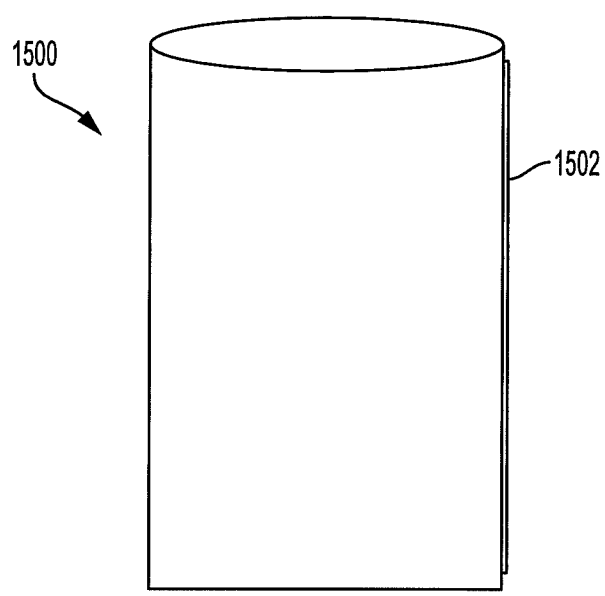
FIG. 15 illustrates one embodiment of the level sensor label printed by a 3D printer on a sidewall of a container.

FIG. 15 illustrates a similar concept, but as opposed to being integrated into the sidewall, container 1500 is constructed by 3D printing where the level sensing label 1502 is printed on the outer surface of the container 1500.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A level sensing system comprising;
   a level sensor label configured to be associated with a container containing a material whose level is to be sensed, the level sensor label arrangement having a circuit including:
   a capacitive structure configured to be associated with the container, wherein the capacitive structure is configured as two separate capacitive elements positioned a distance from each other;
   a first inductive element arrangement in an electrical connection with the capacitive structure; and
   a second inductive element arrangement in electrical connection with the first inductive element arrangement and the capacitive structure, wherein the electrical connection of the first inductive element arrangement and the second inductive element arrangement is an electrical series connection through a connector, and wherein the first inductive element arrangement and the second inductive element arrangement are in an electrical connection with the capacitive structure via connector lines.

2. The level sensing system of claim 1 wherein the container includes one of a fluid and a solid material.

3. The level sensing system of claim 1 wherein the capacitive structure is an inter-digitated structure including pairs of horizontally oriented strips providing a digital capacitive structure.

4. The level sensing system of claim 1 wherein the level sensor label is a printed level sensor label.

5. The level sensing system of claim 1 wherein the level sensor label further includes an antenna for RF backscatter measurement.

6. The level sensing system of claim 1 further including a reader configured to receive signals from the level sensor label arrangement.

7. The level sensing system of claim 6 wherein the reader includes remote communication capability.

8. The level sensing system of claim 6, wherein the reader is configured to communicate with the level sensor label via near field coupling to the inductor of the level sensor label.

9. The level sensing system of claim 6 wherein the reader is one of a reader built into a holder, a reader built into a shelf, and a reader which is a handheld reader.

10. The level sensing system of claim 6 wherein the reader further includes a built in data storage for batch communication of data.

11. A method of forming a level sensing system comprising:
   forming a level sensor label including,
      printing a first capacitive element;
      printing a second capacitive element, separate from the first capacitive element, a predetermined distance from the first capacitive element, wherein the first capacitive element and the second capacitive element form a capacitive structure;
      printing a first inductive element in an electrical connection with the capacitive structure;
      printing a second inductive element in electrical connection arrangement with the first inductive element arrangement with the capacitive structure; and printing electrical connections between the capacitive structure and the inductive elements, wherein the electrical connection of the first inductive element arrangement and the second inductive element arrangement is an electrical series connection through a connector, and wherein the first inductive element arrangement and the second inductive element arrangement are in an electrical connection with the capacitive structure via connector lines.

12. The method of claim 11 further including forming a reader configured to read signals from the level sensor label.

13. The method according to claim 11 further including placing the capacitive structure in association with an outer surface of a container, wherein electric field lines formed by the capacitive structure pass through at least a portion of an interior of the container.

14. The method according to claim 11 wherein the printing is at least one of ink-jet type printing, extrusion type printing, screen type printing, gravure type printing, aerosol type printing and 3D type printing.

15. The method according to claim 11 further including printing the capacitive structure and the inductive elements with a conductive ink type material.

16. The method according to claim 11 further including sensing signals from the level sensor label by a reader.

17. The method according to claim 11 further including printing an antenna as part of the level sensor label.

18. The level sensing system of claim 1 wherein the level sensor label is a disposable printed level sensor label adhered to a surface of a container.

* * * * *